US011601281B2

(12) United States Patent
Soman (10) Patent No.: US 11,601,281 B2
(45) Date of Patent: Mar. 7, 2023

(54) MANAGING USER PROFILES SECURELY IN A USER ENVIRONMENT (71) Applicant: VMware, Inc., Palo Alto, CA (US)

(72) Inventor: Sisimon Soman, Sunnyvale, CA (US)

(73) Assignee: VMWARE, INC., Palo Alto, CA (US)

(*) Notice: Subject to any disclaimer, the term of this patent is extended or adjusted under 35 U.S.C. 154(b) by 819 days.

(21) Appl. No.: 15/194,423

(22) Filed: Jun. 27, 2016

(65) Prior Publication Data
US 2017/0373853 A1 Dec. 28, 2017

(51) Int. Cl.
G06F 21/44 (2013.01)
G06F 21/51 (2013.01)
G06F 21/56 (2013.01)
H04L 9/32 (2006.01)

(52) U.S. Cl.
CPC .......... H04L 9/3239 (2013.01); G06F 21/44 (2013.01); G06F 21/51 (2013.01); G06F 21/56 (2013.01); H04L 9/3263 (2013.01); G06F 2221/033 (2013.01)

(58) Field of Classification Search
CPC ........ G06F 21/44; G06F 21/56; G06F 21/121; G06F 21/6218; G06F 2221/1241; G06F 21/50; G06F 21/51; G06F 21/565; G06F 2221/033; H04L 9/3239; H04L 9/3263; H04L 631/08; H04L 631/101; H04W 12/08
See application file for complete search history.

(56) References Cited

U.S. PATENT DOCUMENTS

| 5,768,592 A * | 6/1998 | Chang ................. G06F 11/3466 427/240 |
| 6,016,466 A * | 1/2000 | Guinther ............. G06F 11/3419 702/186 |
| 6,944,857 B1 * | 9/2005 | Glaser ...................... G06F 8/65 713/155 |
| 2008/0104416 A1 * | 5/2008 | Challener ............ H04L 9/3236 713/189 |
| 2009/0172160 A1 * | 7/2009 | Klein ................ G06F 17/30867 709/225 |
| 2009/0327720 A1 * | 12/2009 | Cathro ................ G06F 21/6209 713/168 |
| 2013/0331141 A1 * | 12/2013 | Montemurro ......... H04W 48/18 455/515 |
| 2013/0340034 A1 * | 12/2013 | Rich ...................... G06F 21/74 726/1 |

(Continued)

Primary Examiner — Amie C. Lin
(74) Attorney, Agent, or Firm — Patterson + Sheridan, LLP (57) ABSTRACT User profiles of applications installed in a user environment, which may be compromised by malware, are managed to protect against such malware gaining access to sensitive data that may be contained in the user profiles. The method includes the steps of detecting, by a management agent of a user environment, a launch of an application within the user environment, verifying, by a filter driver, an identity of the application against a stored profile of the application, and responsive to determining that the identity of the application matches the stored profile of the application, importing, by the management agent, an encrypted user profile from a remote storage to local storage, decrypting, by the filter driver, the encrypted user profile, and providing the decrypted user profile to the application.

20 Claims, 5 Drawing Sheets

(56) References Cited

U.S. PATENT DOCUMENTS

| | | | |
|---|---|---|---|
| 2014/0215573 A1* | 7/2014 | Cepuran | G06F 21/31 726/4 |
| 2014/0232657 A1* | 8/2014 | Aviles | G06F 9/541 345/173 |
| 2014/0310793 A1* | 10/2014 | Liu | H04L 63/083 726/8 |
| 2016/0132869 A1* | 5/2016 | Stade | G06Q 20/4018 705/75 |
| 2016/0359862 A1* | 12/2016 | Riva | H04L 63/102 |

\* cited by examiner

MANAGING USER PROFILES SECURELY IN A USER ENVIRONMENT

BACKGROUND

To provide a seamless and unified experience across different user sessions and different devices, many applications rely on maintaining a user profile for each user. A user profile is the collection of settings, customizations, add-ons, and other personalizations that a user has made or installed on their version of the application. In some cases, the user profiles also contain user names and passwords for certain websites to speed up logging in without the user having to remember that information each time they access the website in question. In this way, user profiles allow the user to have access to their saved, personal set of customizations for the next time they use the application. Moreover, this approach allows the user to have a seamless experience regardless of whether they are using the application on a work computer or from a personal device.

Furthermore, it is becoming increasingly common for users to use their own personal devices (such as a phone or a laptop) in order to access corporate data, a practice known as BYOD (Bring Your Own Device). However, in contrast to a managed environment in which the administrator has full control over any client devices and the applications running thereon, a personal device is unsecured and can potentially act as a vector for malware or other types of hostile or intrusive software to infect the corporate environment. If a user profile contains sensitive corporate or personal information, this could result in a potentially catastrophic data breach and presents a serious security concern.

SUMMARY

User profiles of applications installed in a user environment, which may be compromised by malware, are managed to protect against such malware gaining access to sensitive data that may be contained in the user profiles. The method includes the steps of detecting, by a management agent of a user environment, a launch of an application within the user environment, verifying, by a filter driver, an identity of the application against a stored profile of the application, and responsive to determining that the identity of the application matches the stored profile of the application, importing, by the management agent, an encrypted user profile from a remote storage to local storage, decrypting, by the filter driver, the encrypted user profile, and providing the decrypted user profile to the application.

Further embodiments of the present invention include, without limitation, a non-transitory computer-readable storage medium that includes instructions for a processor to carry out the above method, and a computer system that includes a processor programmed to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
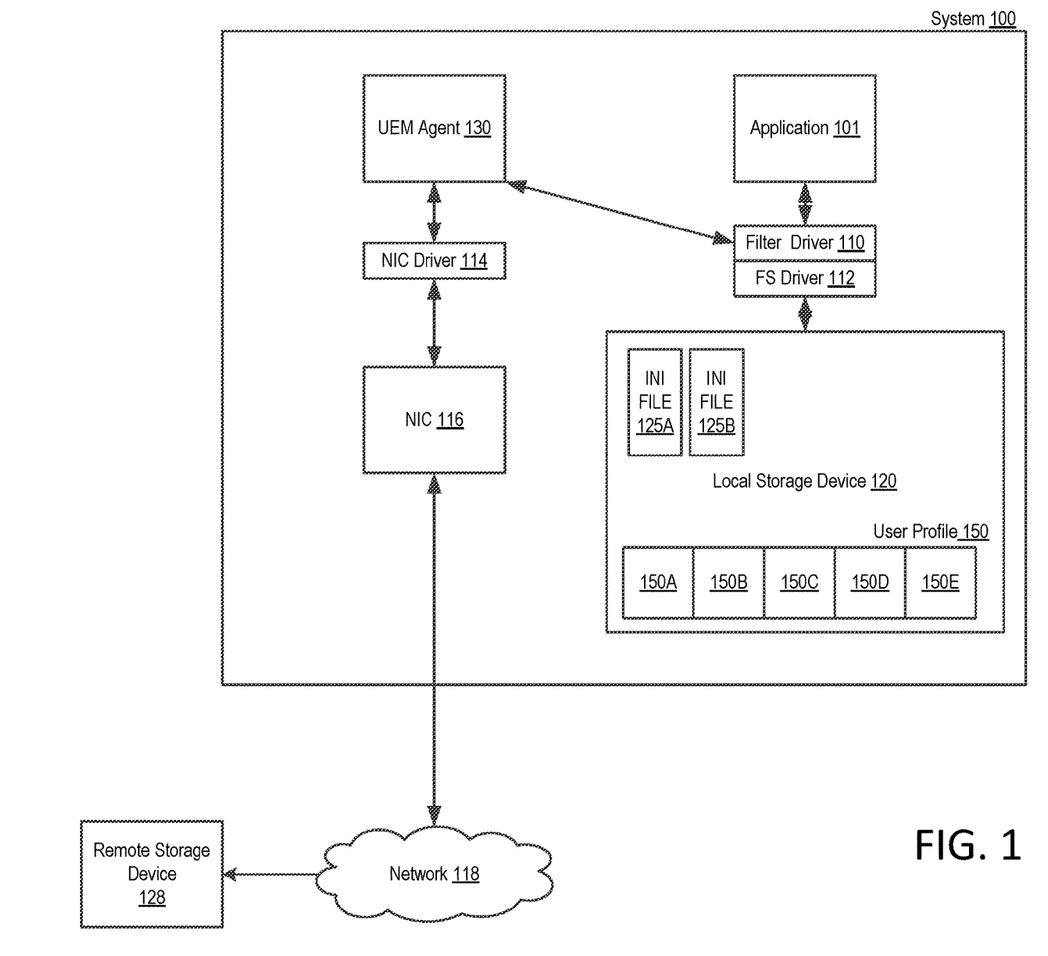
FIG. 1 is a block diagram illustrating a computing system in which embodiments may be practiced.

FIG. 1 is a block diagram depicting a computing system 100, in which embodiments may be practiced. In one embodiment, computing system 100 is a personal mobile computing device, e.g., a smartphone, that is configured with a user environment that is managed remotely, e.g., by an information technology (IT) administrator of an enterprise. One example of such a management product is VMware User Environment Manager, which is commercially available from VMware, Inc. of Palo Alto, Calif. To enable remote management of the desktop environment, a user environment management (UEM) agent 130 is installed in computing system 100 for execution in user space and a filter driver 110 is installed as a software layer in an input/output operation (IO) stack that handles IOs issued by one or more applications 101 running in the user environment. Other software layers of the IO stack depicted in FIG. 1 includes file system driver 112.

As depicted in FIG. 1, computing system 100 further includes a network interface card (NIC) 116 by which computer system 100 communicates over a network 118. UEM agent 130 accesses NIC 116 for communication with a remote storage device 128, which stores encrypted versions of user profiles for user environments such as the one configured in computing system 100. Computing system 100 also includes a local storage device 120, which stores user profile 150 and .ini files 125A, 125B. User profile 150, as depicted, comprises blocks 150A, 150B, 150C, 150D, 150E. Each of blocks 150A-E is a portion of the user profile 150 that can be read from local storage device and/or written to local storage device in a single transaction. Each of .ini files 125A-B is the output of an application profiler (further described below) and contains a record of the application name, the user profile directory registration path, user profile directory file system path, application hash value, and application certificate data.

Figure 2:
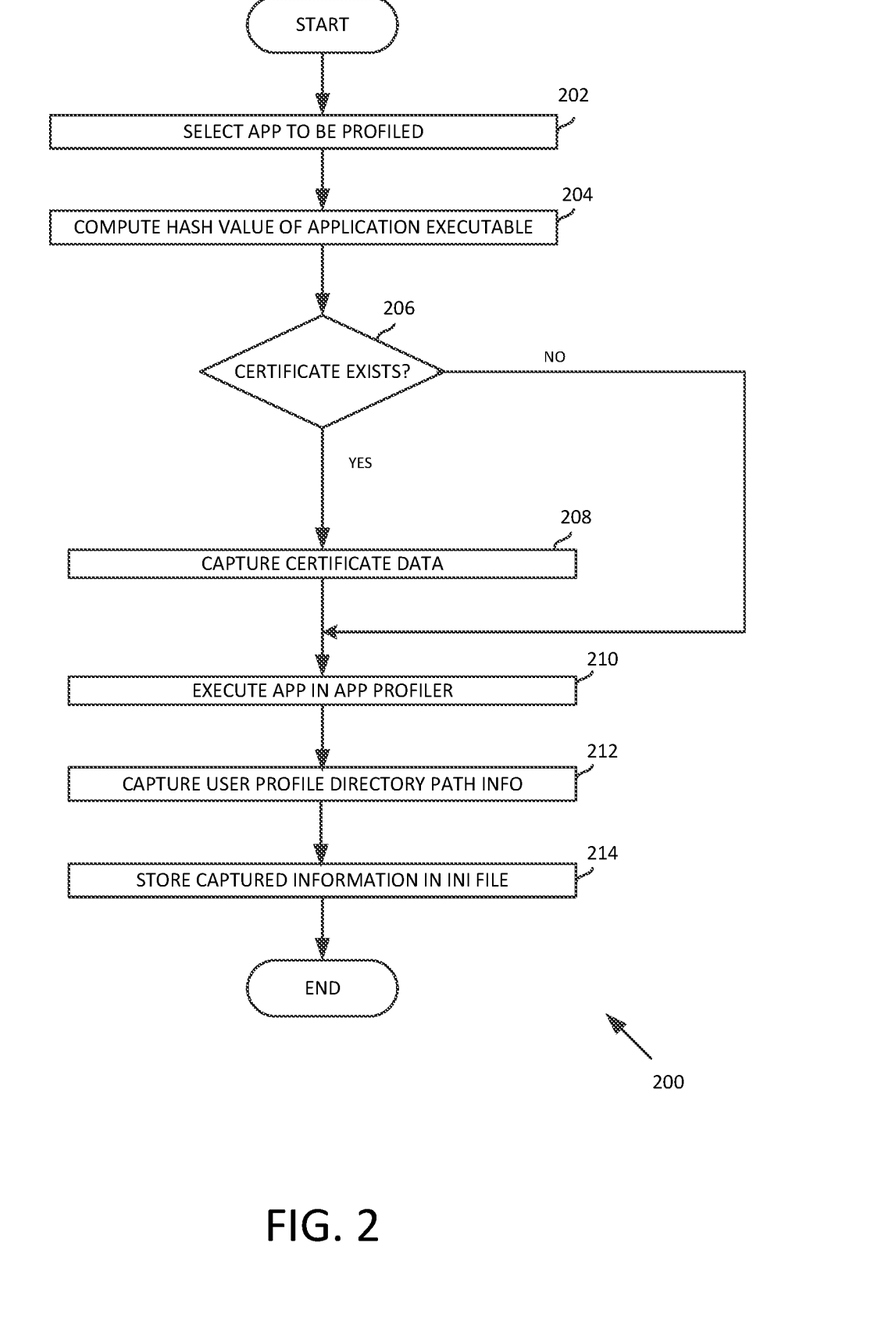
FIG. 2 is a flow diagram illustrating a method of profiling an application.

FIG. 2 is a flow diagram depicting an exemplary method for profiling an application. Referring to flow diagram 200 of FIG. 2, an administrator initiates the application profiling process to profile a new application, or a new version of an already profiled application. The reasons for the profiling are to detect the file system and registry profile path of the application and to verify at a later time that an application that is executed within a user environment managed by the administrator is an authorized application, and not malware. At step 202, the administrator selects the application to be profiled by providing to the application profiler the file system path of the executable of the application. At step 204, the application profiler computes a hash value of the executable of the application. For example, the hash value can be computed using the SHA-2 algorithm. Alternatively, the hash value can be computed using the MD5 algorithm or any other appropriate hash algorithm. At step 206, the application profiler checks whether the application has a digital certificate associated therewith. If not, the method proceeds to step 210.

At step 208, upon determining that the application has an associated digital certificate, the application profiler captures the certificate data. Certificate data contain information such as certificate issuer, the company that the certificate was issued to, expiration dates, and other information about the executable. At step 210, the application is executed inside the application profiler and, during this execution, application profiler captures the relevant settings and configurations of the application. At step 212, the application profiler captures the information about the file system path and the registry path used by the application to create and store user profiles. At step 214, the application profiler stores the information gathered in steps 204, 208, 210 and 212 into an .ini file associated with the application.

Figure 3:
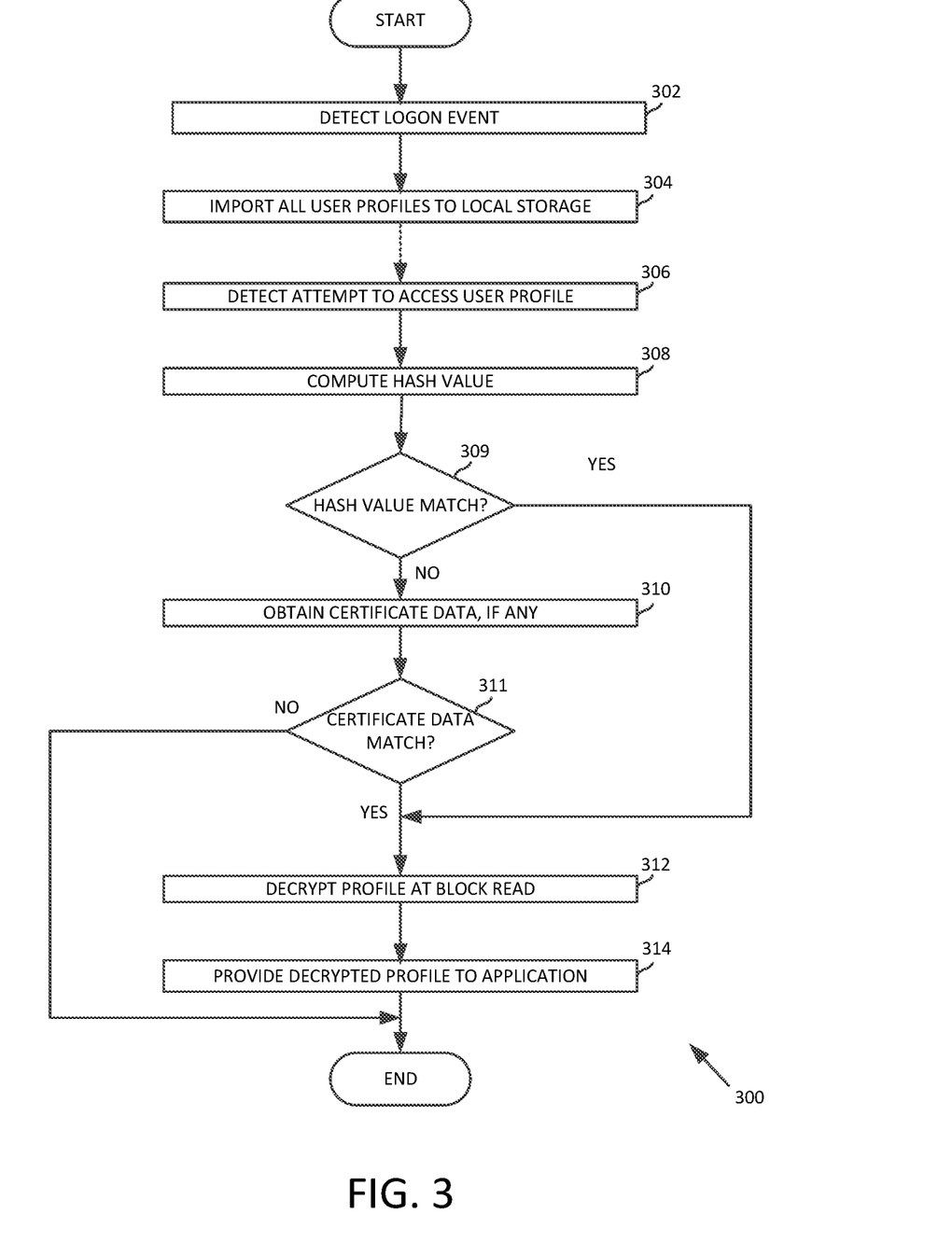
FIG. 3 is a flow diagram illustrating a method of importing user profiles of all applications in response to a logon event.

FIG. 3 is a flow diagram illustrating a method of importing user profiles of all applications in response to a logon event. Referring to flow diagram 300 of FIG. 3, at step 302, UEM agent 130 detects a logon event. For example, the logon event may be triggered when a user logs into his or her corporate account from his or her mobile computing device. At step 304, UEM agent 130, in response to detecting the logon event, imports all user profiles for all applications associated with the user to local storage device 120. In the embodiments illustrated herein, encrypted versions of such user profiles stored in remote storage device 128 are imported into local storage device 120.

After step 304, the remaining steps of flow diagram 300 are executed by filter driver 110 when a particular application tries to access a user profile for that application. At step 306, filter driver 110 detects such an attempt by an application to access the user profile for that application. Filter driver 110 is able to detect such an attempt by reading the file system path used by the application to create and store user profiles from the .ini file associated with the application. Upon detection, at step 308, filter driver 110 computes the hash value of the executable of the application requesting access to the user profile. At step 309, filter driver 110 compares the hash value computed at step 308 with a hash value for the application stored in the .ini file.

At step 310, in response to determining that the hash value computed at step 308 differs from the stored hash value, filter driver 110 obtains certificate data associated with the application, if any. At step 311, filter driver 110 compares the certificate data obtained at step 310 with certificate data for the application stored in the .ini file.

At step 312, upon determining that either the hash value matches the stored hash value or the certificate data match the stored certificate data, blocks of the user profile are retrieved from local storage device 120 through file system driver 112 on a block-by-block basis and decrypted by filter driver 110. At step 314, filter driver 110 returns the decrypted user profile to the application.

If the hash value computed at step 308 differs from the stored hash value and the certificate data does not match the stored certificate data, flow diagram 300 is terminated without the user profile being returned to the application.

Figure 4:
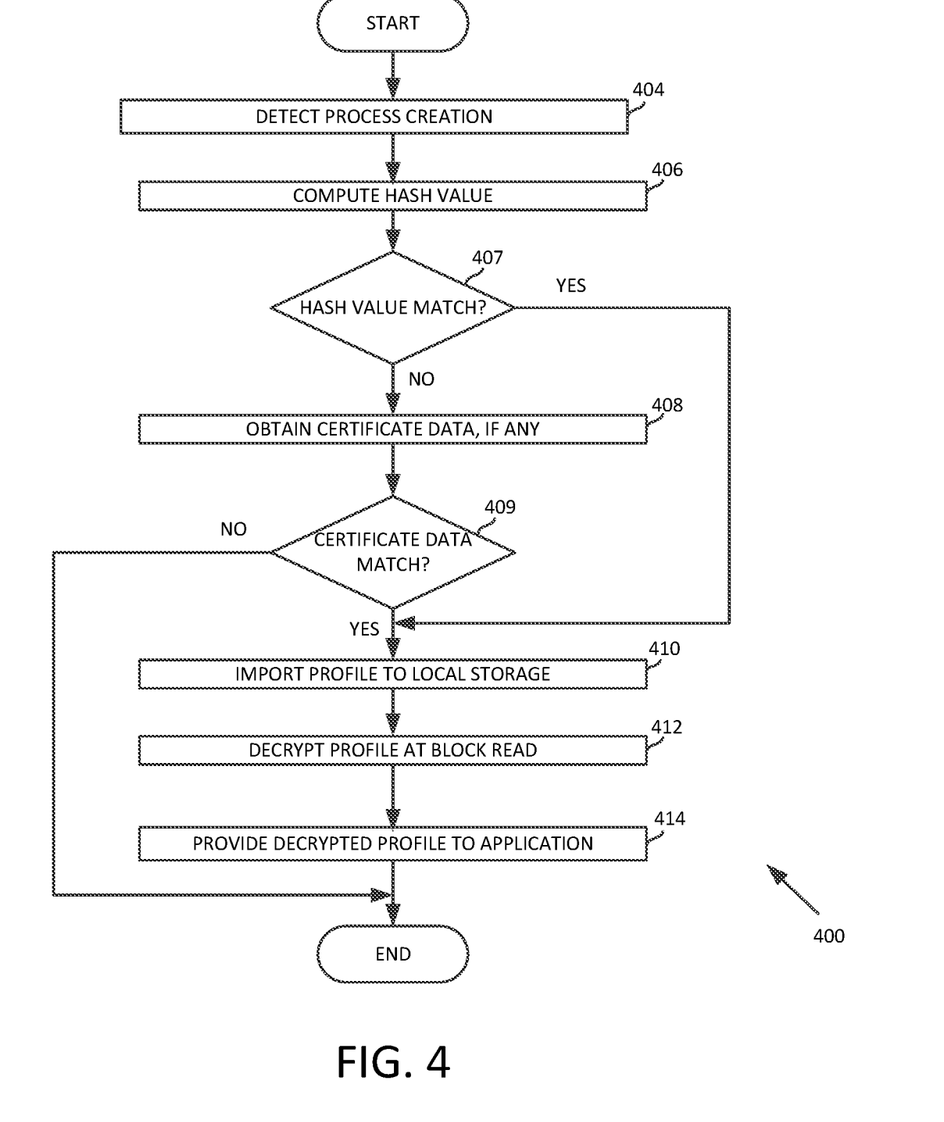
FIG. 4 is a flow diagram illustrating a method of importing user profiles of a particular application being launched, when the application is launched.

FIG. 4 is a flow diagram illustrating a method of importing user profiles of a particular application being launched, when the application is launched. This method is an alternative to the method of FIG. 3 and is a way to reduce the impact of boot storms. For example, an administrator may configure applications with a large installed base to have user profiles imported upon launch rather than upon logon. Referring to flow diagram 400 of FIG. 4, at step 404, a new process associated with the application launch is detected by UEM agent 130. At step 406, filter driver 110 computes the hash value of the executable of the launched application. At step 407, filter driver 110 compares the hash value computed at step 406 with a hash value for the application stored in the .ini file associated with the application.

At step 408, in response to determining that the hash value computed at step 407 differs from the stored hash value, filter driver 110 obtains certificate data associated with the application, if any. At step 409, filter driver 110 compares the certificate data obtained at step 407 with certificate data for the application stored in the .ini file.

At step 410, upon determining that either the hash value matches the stored hash value or the certificate data match the stored certificate data, UEM agent 130 imports the encrypted user profile to local storage device 120. At step 412, blocks of the user profile are retrieved from local storage device 120 through file system driver 112 on a block-by-block basis and decrypted by filter driver 110. At step 414, filter driver 110 returns the decrypted user profile to the application.

Figure 5:
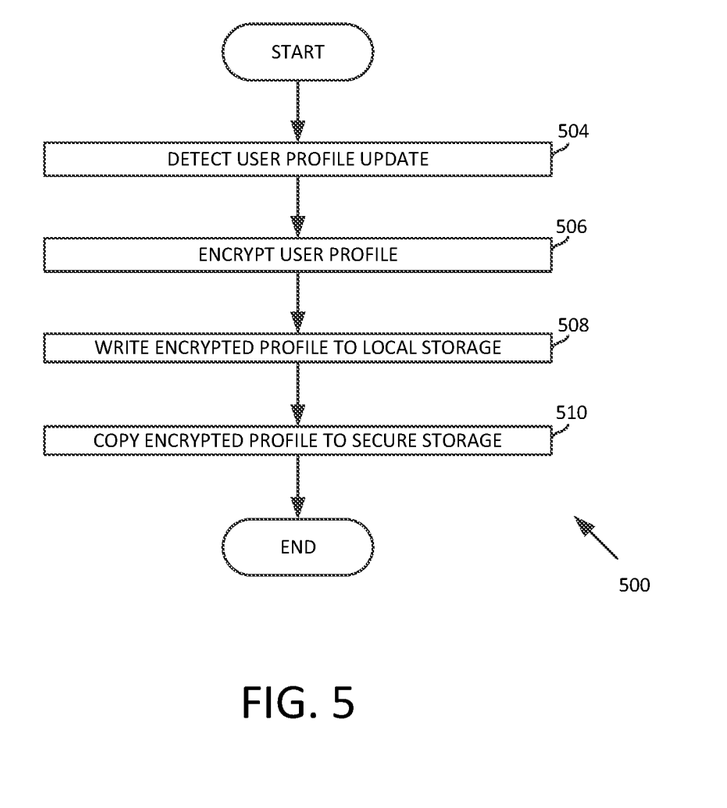
FIG. 5 is a flow diagram illustrating a method of saving changes to a user profile.

FIG. 5 is a flow diagram illustrating a method of saving changes to a user profile. Referring to flow diagram 500 of FIG. 5, at step 502, filter driver 110 detects an update to the user profile. Filter driver 110 at step 506 encrypts the user profile on a block-by-block basis and at 508 writes the encrypted blocks to local storage device 120 through file system driver 112. At step 510, UEM agent 130 copies the encrypted profile to remote storage device 128. The copying of the encrypted profile to remote storage device 128 is carried out periodically or during idle periods of computing system 100. Upon application closing event or a general shutdown event, all encrypted user profiles that have not yet been copied to remote storage device 128 will be copied to remote storage device 128 as part of the shutdown process.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of managing a user profile, comprising:
    detecting, by a management agent of a user environment, a launch of an application within the user environment;
    verifying, by a filter driver, an identity derived from the application against a stored profile of the application, wherein the stored profile is created by executing the application and capturing a directory path within the user environment from the executed application; and
    responsive to determining that the identity derived from the application matches the stored profile of the application, importing, by the management agent, an encrypted user profile from a remote storage to a local storage, decrypting, by the filter driver, the encrypted user profile, and providing the decrypted user profile to the application.

2. The method of claim 1, wherein verifying an identity derived from the application comprises:
    computing a hash value from the application;
    comparing the computed hash value with a stored hash value associated with the application; and
    confirming that the identity derived from the application is verified if the computed hash value matches the stored hash value.

3. The method of claim 1, wherein verifying an identity derived from the application comprises:
    retrieving certificate data associated with the application;
    comparing the retrieved certificate data with a stored certificate data associated with the application; and
    confirming that the identity derived from the application is verified if the retrieved certificate data matches the stored certificate data.

4. The method of claim 1, wherein the stored profile of the application is further created by:
    computing a hash value from the application;
    capturing certificate data for the application;
    capturing a user profile directory path within the user environment associated with the application; and
    storing the hash value, the certificate data, and the user profile directory path in the stored profile of the application.

5. The method of claim 1, further comprising:
    detecting, by the management agent, an updated user profile for an application;
    encrypting, by the filter driver, the updated user profile; and
    writing, by a file system driver, the encrypted updated user profile to the local storage.

6. The method of claim 5, further comprising:
    upon detecting a closing of the application associated with the updated user profile or a shutdown, copying, by the management agent, the encrypted updated user profile to the remote storage.

7. The method of claim 1, wherein the directory path within the user environment is used by the application for storing the user profile.

8. The method of claim 1, wherein executing the application further comprises:
    executing the application via an application profiler configured to capture the directory path within the user environment; and
    storing, by the application profiler, the directory path in the stored profile of the application.

9. A non-transitory computer readable medium comprising instructions, which when executed by a computing device causes the computing device to perform the steps comprising:
    detecting, by a management agent of a user environment, a launch of an application within the user environment;
    verifying, by a filter driver, an identity derived from the application against a stored profile of the application, wherein the stored profile is created by executing the application and capturing a directory path within the user environment from the executed application; and
    responsive to determining that the identity derived from the application matches the stored profile of the application, importing, by the management agent, an encrypted user profile from a remote storage to a local storage, decrypting, by the filter driver, the encrypted user profile, and providing the decrypted user profile to the application.

10. The non-transitory computer readable medium of claim 9, wherein the instructions further cause the computing device to perform the steps further comprising:
    computing a hash value from the application;
    comparing the computed hash value with a stored hash value associated with the application; and
    confirming that the identity derived from the application is verified if the computed hash value matches the stored hash value.

11. The non-transitory computer readable medium of claim 9, wherein the instructions further cause the computing device to perform the steps comprising:
    retrieving certificate data associated with the application;
    comparing the retrieved certificate data with a stored certificate data associated with the application; and confirming that the identity derived from the application is verified if the retrieved certificate data matches the stored certificate data.

12. The non-transitory computer readable medium of claim 9, wherein the instructions further cause the computing device to perform the steps comprising:
   computing a hash value from the application;
   capturing certificate data for the application;
   capturing a user profile directory path within the user environment associated with the application; and
   storing the hash value, the certificate data, and the user profile directory path in the stored profile of the application.

13. The non-transitory computer readable medium of claim 9, wherein the instructions further cause the computing device to perform the steps comprising:
   detecting, by the management agent, an updated user profile for an application;
   encrypting, by the filter driver, the updated user profile; and
   writing, by a file system driver, the encrypted updated user profile to the local storage.

14. The non-transitory computer readable medium of claim 13, wherein the instructions further cause the computing device to perform the steps comprising:
   upon detecting a closing of the application associated with the updated user profile or a shutdown, copying, by the management agent, the encrypted updated user profile to the remote storage.

15. A computer system comprising a processor, a memory, and a local storage, and connected to a remote storage over a network, wherein the processor is programmed with:
   a management agent of a user environment that detects a launch of an application within the user environment; and
   a filter driver that verifies an identity derived from the application against a stored profile of the application, wherein the stored profile is created by executing the application and capturing a directory path within the user environment from the executed application,
   wherein, responsive to determining that the identity derived from the application matches the stored profile of the application, the management agent imports an encrypted user profile from the remote storage to the local storage, and the filter driver decrypts the encrypted user profile and provides the decrypted user profile to the application.

16. The computer system of claim 15, wherein the filter driver verifies an identity derived from the application by:
   computing a hash value from the application;
   comparing the computed hash value with a stored hash value associated with the application; and
   confirming that the identity from the application is verified if the computed hash value matches the stored hash value.

17. The computer system of claim 15, wherein the filter driver verifies an identity derived from the application by:
   retrieving certificate data associated with the application;
   comparing the retrieved certificate data with a stored certificate data associated with the application; and
   confirming that the identity derived from the application is verified if the retrieved certificate data matches the stored certificate data.

18. The computer system of claim 15, wherein the stored profile of the application is further created by:
   computing a hash value from the application;
   capturing certificate data for the application;
   capturing a user profile directory path within the user environment associated with the application; and
   storing the hash value, the certificate data, and the user profile directory path in the stored profile of the application.

19. The computer system of claim 15, wherein
   the management agent is further programmed to detect an updated user profile for an application, the filter driver is further programmed to encrypt the updated user profile; and
   the processor is further programmed with a file system driver that writes the encrypted updated user profile to the local storage.

20. The computer system of claim 19, wherein
   upon detecting a closing of the application associated with the updated user profile or a shutdown, the management agent copies the encrypted updated user profile to the remote storage.

* * * * *